United States Patent
Lanman, III et al.

(10) Patent No.: US 9,678,709 B1
(45) Date of Patent: *Jun. 13, 2017

(54) PROCESSING SOUND USING COLLECTIVE FEEDFORWARD

(71) Applicant: Doppler Labs, Inc., New York, NY (US)

(72) Inventors: Richard Fritz Lanman, III, San Francisco, CA (US); Noah Kraft, New York, NY (US); Matthew J. Jaffe, III, San Francisco, CA (US); Gints Klimanis, SunnyVale, CA (US); Jeff Baker, Newbury Park, CA (US)

(73) Assignee: Doppler Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,761

(22) Filed: Nov. 25, 2015

(51) Int. Cl.
| | |
|---|---|
| *G06F 3/16* | (2006.01) |
| *H04R 1/10* | (2006.01) |
| *H04L 29/08* | (2006.01) |
| *H04W 4/02* | (2009.01) |
| *H04W 4/04* | (2009.01) |
| *G06F 3/0484* | (2013.01) |

(52) U.S. Cl.
CPC ........... *G06F 3/165* (2013.01); *H04R 1/1016* (2013.01); *H04R 1/1083* (2013.01); *G06F 3/0484* (2013.01); *H04L 67/18* (2013.01); *H04L 67/30* (2013.01); *H04R 2460/07* (2013.01); *H04W 4/025* (2013.01); *H04W 4/043* (2013.01)

(58) Field of Classification Search
CPC .. H04R 1/1083; H04R 3/002; H04R 2460/07; H04R 2420/07; H04R 1/1041; H04R 1/1091; H04R 1/10; H04R 2460/13; H04R 29/00; H04R 13/12; H04R 13/00; H04R 13/005; H04R 5/033; H04R 5/04; H04R 2225/55; H04W 4/02; H04W 4/025; H04W 4/043; G10L 21/0208; G10L 25/72; G10K 2210/3027; G06F 3/165; G06F 3/011; G06F 3/167; G06F 17/30749; G06F 17/30761; G06F 17/30026; G06F 3/162; H04L 67/18; H04L 67/30; H04M 1/725
USPC ....................................................... 381/104
See application file for complete search history.

(56) References Cited

U.S. PATENT DOCUMENTS

| | | |
|---|---|---|
| 5,566,237 A | 10/1996 | Dobbs et al. |
| 5,576,685 A | 11/1996 | Saito |

(Continued)

FOREIGN PATENT DOCUMENTS

| | | |
|---|---|---|
| EP | 2846328 | 3/2015 |
| EP | 2846358 | 3/2015 |
| WO | 2013069556 A1 | 5/2015 |

*Primary Examiner* — Davetta W Goins
*Assistant Examiner* — Oyesola C Ojo
(74) *Attorney, Agent, or Firm* — Van Pelt, Yi & James LLP (57) ABSTRACT

Personal audio systems and methods are disclosed. A personal audio system includes a processor to generate a personal audio stream by processing an ambient audio stream in accordance with an active processing parameter set, a circular buffer memory to store a most recent snippet of the ambient audio stream, and an event detector to detect a trigger event. In response to detection of the trigger event, a controller may transmit, to a knowledgebase remote from the personal audio system, the most recent snippet of the ambient audio stream and associated metadata.

26 Claims, 6 Drawing Sheets

(56) References Cited

U.S. PATENT DOCUMENTS

| | | | |
|---|---|---|---|
| 5,604,812 | A | 2/1997 | Meyer |
| 6,868,162 | B1 | 3/2005 | Jubien et al. |
| 7,283,850 | B2 | 10/2007 | Granovetter et al. |
| 7,391,877 | B1 | 6/2008 | Brungart |
| 8,306,204 | B2 | 11/2012 | Erhart et al. |
| 8,335,312 | B2 | 12/2012 | Gerhardt et al. |
| 8,649,540 | B2 | 2/2014 | Killion et al. |
| 8,718,291 | B2 | 5/2014 | Alves et al. |
| 8,750,544 | B2 | 6/2014 | Killion et al. |
| 9,253,560 | B2 * | 2/2016 | Goldstein ......... G06F 17/30743 |
| 2004/0052391 | A1 | 3/2004 | Bren et al. |
| 2008/0112569 | A1 * | 5/2008 | Asada .................. G10K 11/178 381/71.1 |
| 2008/0118078 | A1 | 5/2008 | Asada et al. |
| 2008/0181419 | A1 * | 7/2008 | Goldstein .............. H04R 3/002 381/57 |
| 2009/0254340 | A1 | 10/2009 | Sun |
| 2010/0022269 | A1 | 1/2010 | Terlizzi |
| 2010/0033313 | A1 | 2/2010 | Keady et al. |
| 2010/0040249 | A1 | 2/2010 | Lenhardt |
| 2010/0086137 | A1 * | 4/2010 | Nicolino, Jr. ............ H04R 3/02 381/56 |
| 2010/0146445 | A1 * | 6/2010 | Kraut ....................... H04N 5/60 715/821 |
| 2010/0172510 | A1 * | 7/2010 | Juvonen ............... G10K 11/178 381/71.6 |
| 2011/0096933 | A1 | 4/2011 | Eastty |
| 2011/0103613 | A1 | 5/2011 | Van Der Werf et al. |
| 2011/0158420 | A1 | 6/2011 | Hannah |
| 2011/0188389 | A1 | 8/2011 | Hedley et al. |
| 2011/0222700 | A1 | 9/2011 | Bhandari |
| 2011/0228950 | A1 | 9/2011 | Abrahamsson et al. |
| 2011/0243344 | A1 | 10/2011 | Bakalos et al. |
| 2012/0010881 | A1 | 1/2012 | Avendano |
| 2012/0189140 | A1 | 7/2012 | Hughes |
| 2013/0208909 | A1 | 8/2013 | Mulder |
| 2013/0236040 | A1 | 9/2013 | Crawford et al. |
| 2014/0044269 | A1 | 2/2014 | Anderson |
| 2014/0046659 | A1 | 2/2014 | Burton et al. |
| 2014/0105412 | A1 | 4/2014 | Alves et al. |
| 2014/0185828 | A1 | 7/2014 | Helbling |
| 2014/0198926 | A1 | 7/2014 | Killion et al. |
| 2014/0211972 | A1 | 7/2014 | Kim et al. |
| 2014/0221017 | A1 | 8/2014 | Jensen et al. |
| 2014/0277650 | A1 | 9/2014 | Zurek et al. |
| 2014/0314245 | A1 * | 10/2014 | Asada ................ G10K 11/1788 381/71.6 |
| 2014/0314261 | A1 | 10/2014 | Selig et al. |
| 2014/0321660 | A1 | 10/2014 | Harsch |
| 2014/0334644 | A1 * | 11/2014 | Selig ....................... G06F 3/165 381/108 |
| 2015/0003652 | A1 | 1/2015 | Bisgaard et al. |
| 2015/0063575 | A1 * | 3/2015 | Tan .................. G06F 17/30743 381/56 |
| 2015/0162021 | A1 | 6/2015 | Anhari |
| 2015/0190284 | A1 | 7/2015 | Di Censo et al. |
| 2016/0259619 | A1 | 9/2016 | Appell et al. |

\* cited by examiner

PROCESSING SOUND USING COLLECTIVE FEEDFORWARD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent is related to patent application Ser. No. 14/681,843, entitled "Active Acoustic Filter with Location-Based Filter Characteristics," filed Apr. 8, 2015; and patent application Ser. No. 14/819,298, entitled "Active Acoustic Filter with Automatic Selection Of Filter Parameters Based on Ambient Sound," filed Aug. 5, 2015.

BACKGROUND

Field

This disclosure relates generally to digital active audio filters for use in a listener's ear to modify ambient sound to suit the listening preferences of the listener. In particular, this disclosure relates to active audio filters that suppress noise based on information collected from a large plurality of users.

Description of the Related Art

Humans' perception to sound varies with both frequency and sound pressure level (SPL). For example, humans do not perceive low and high frequency sounds as well as they perceive midrange frequencies sounds (e.g., 500 Hz to 6,000 Hz). Further, human hearing is more responsive to sound at high frequencies compared to low frequencies.

There are many situations where a listener may desire attenuation of ambient sound at certain frequencies, while allowing ambient sound at other frequencies to reach their ears. For example, at a concert, concert goers might want to enjoy the music, but also be protected from high levels of mid-range sound frequencies that cause damage to a person's hearing. On an airplane, passengers might wish to block out the roar of the engine, but not conversation. At a sports event, fans might desire to hear the action of the game, but receive protection from the roar of the crowd. At a construction site, a worker may need to hear nearby sounds and voices for safety and to enable the construction to continue, but may wish to protect his or her ears from sudden, loud noises of crashes or large moving equipment. Further, a user may wish to engage in conversation and other activities without being interrupted or impaired by annoyance noises such as sounds of engines or motors, crying babies, and sirens. These are just a few common examples where people wish to hear some, but not all, of the sounds in their environment.

In addition to receiving protection from unpleasant or dangerously loud sound levels, listeners may wish to augment the ambient sound by amplification of certain frequencies, combining ambient sound with a secondary audio feed, equalization (modifying ambient sound by adjusting the relative loudness of various frequencies), noise reduction, addition of white or pink noise to mask annoyances, echo cancellation, and addition of echo or reverberation. For example, at a concert, audience members may wish to attenuate certain frequencies of the music, but amplify other frequencies (e.g., the bass). People listening to music at home may wish to have a more "concert-like" experience by adding reverberation to the ambient sound. At a sports event, fans may wish to attenuate ambient crowd noise, but also receive an audio feed of a sportscaster reporting on the event. Similarly, people at a mall may wish to attenuate the ambient noise, yet receive an audio feed of advertisements targeted to their location. These are just a few examples of peoples' listening preferences.

Throughout this description, elements appearing in figures are assigned three-digit reference designators, where the most significant digit is the figure number where the element is introduced and the two least significant digits are specific to the element. An element not described in conjunction with a figure has the same characteristics and function as a previously-described element having the same reference designator.

DETAILED DESCRIPTION

Description of Apparatus

Figure 1:
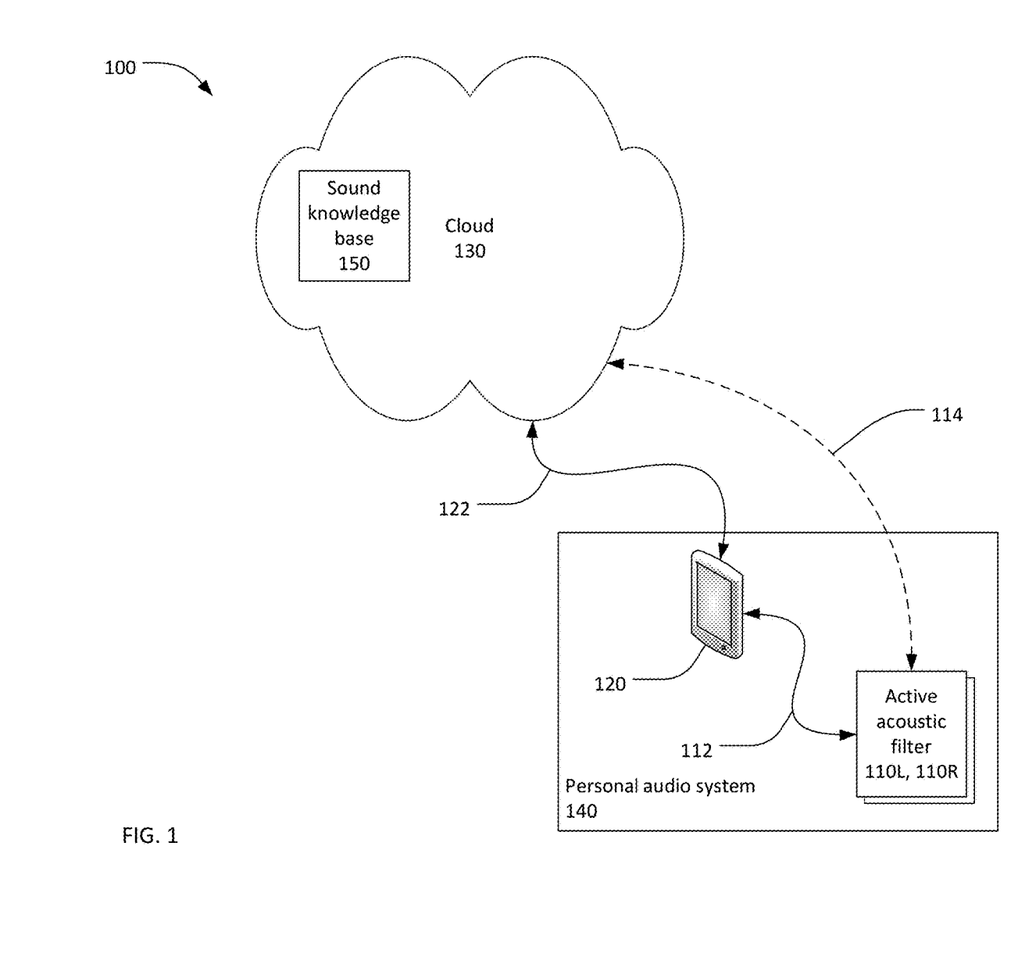
FIG. 1 is a block diagram of sound processing system.

Referring now to FIG. 1, a sound processing system 100 may include at least one a personal audio system 140 and a sound knowledgebase 150 within a cloud 130. In this context, the term "cloud" means a network and all devices that may be accessed by the personal audio system 140 via the network. The cloud 130 may be a local area network, wide area network, a virtual network, or some other form of network together with all devices connected to the network. The cloud 130 may be or include the Internet. The sound processing system 100 may include a large plurality of personal audio systems. The sound knowledgebase 150 will be subsequently described in the discussion of FIG. 5.

The personal audio system 140 includes left and right active acoustic filters 110L, 110R and a personal computing device 120. While the personal computing device 120 is shown in FIG. 1 as a smart phone, the personal computing device 120 may be a smart phone, a desktop computer, a mobile computer, a tablet computer, or any other computing device that is capable of performing the processes described herein. The personal computing device 120 may include one or more processors and memory configured to execute stored software instructions to perform the processes described herein. For example, the personal computing device 120 may run an application program or "app" to perform the functions described herein. The personal computing device 120 may include a user interface comprising a display and at least one input device such as a touch screen, microphone, keyboard, and/or mouse. The personal computing device 120 may be configured to perform geo-location, which is to say to determine its own location.

Geo-location may be performed, for example, using a Global Positioning System (GPS) receiver or by some other method.

The active acoustic filters 110L, 110R may communicate with the personal computing device 120 via a first wireless communications link 112. While only a single first wireless communications link 112 is shown in FIG. 1, each active acoustic filter 110L, 110R may communicate with the personal computing device 120 via separate wireless communication links. The first wireless communications link 112 may use a limited-range wireless communications protocol such as Bluetooth®, WiFi®, ZigBee®, or some other wireless Personal Area Network (PAN) protocol. The personal computing device 120 may communicate with the cloud 130 via a second communications link 122. In particular, the personal computing device 120 may communicate with the sound knowledgebase 150 within the cloud 130 via the second communications link 122. The second communications link 122 may be a wired connection or may be a wireless communications link using, for example, the WiFi® wireless communications protocol, a mobile telephone data protocol, or another wireless communications protocol.

Optionally, the acoustic filters 110L, 110R may communicate directly with the cloud 130 via a third wireless communications link 114. The third wireless communications link 114 may be an alternative to, or in addition to, the first wireless communications link 112. The third wireless connection 114 may use, for example, the WiFi® wireless communications protocol, or another wireless communications protocol. The acoustic filters 110L, 110R may communicate with each other via a fourth wireless communications link (not shown).

Figure 2:
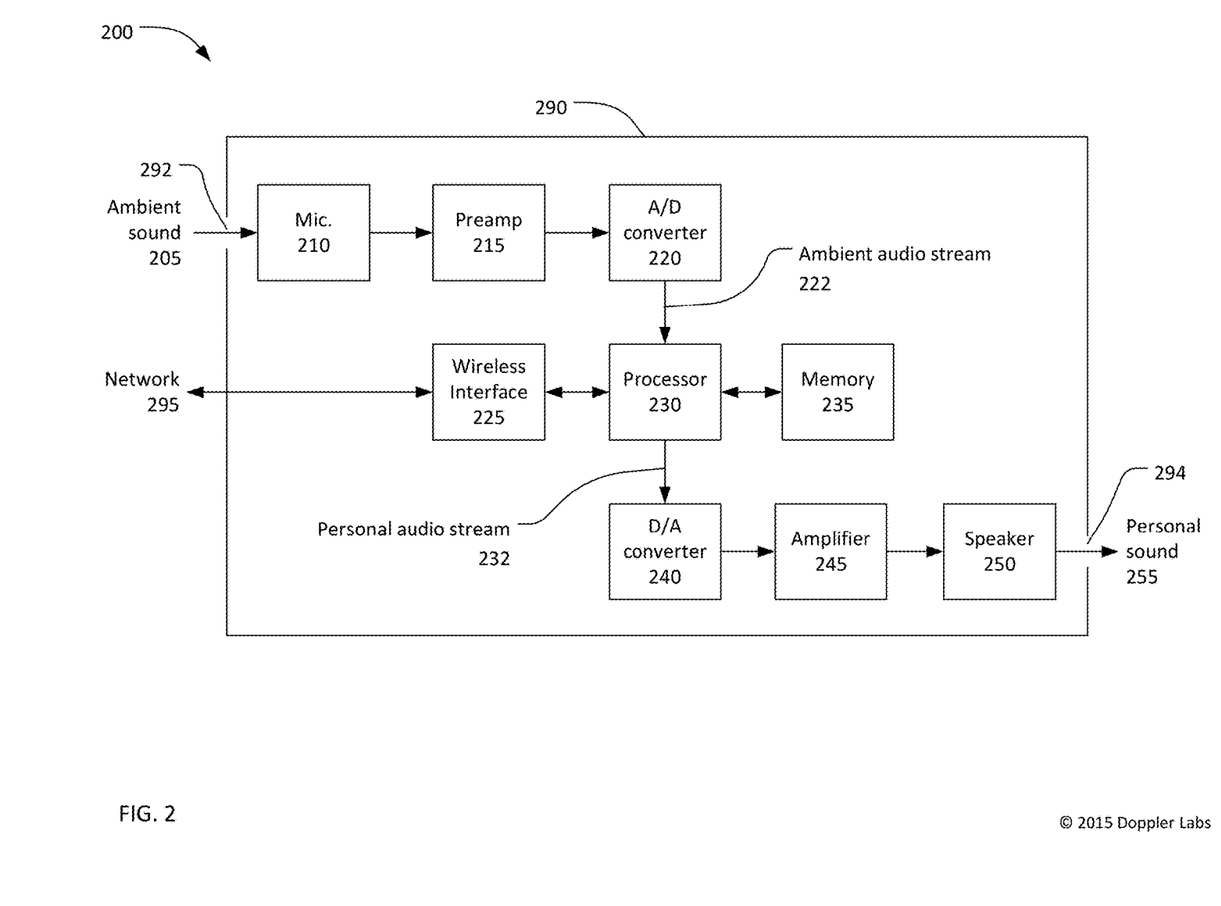
FIG. 2 is block diagram of an active acoustic filter.

FIG. 2 is block diagram of an active acoustic filter 200, which may be the active acoustic filter 110L and/or the active acoustic filter 110R. The active acoustic filter 200 may include a microphone 210, a preamplifier 215, an analog-to-digital (A/D) converter 220, a wireless interface 225, a processor 230, a memory 235, an analog signal by digital-to-analog (D/A) converter 240, and amplifier 245, a speaker 250, and a battery (not shown), all of which may be contained within a housing 290. The active acoustic filter 200 may receive ambient sound 205 and output personal sound 255. In this context, the term "sound" refers to acoustic waves propagating in air. "Personal sound" means sound that has been processed, modified, or tailored in accordance with a user's person preferences. The term "audio" refers to an electronic representation of sound, which may be an analog signal or a digital data.

The housing 290 may be configured to interface with a user's ear by fitting in, on, or over the user's ear such that the ambient sound 205 is mostly excluded from reaching the user's ear canal and the personal sound 255 generated by the active acoustic filter is provided directly into the user's ear canal. The housing 290 may have a first aperture 292 for accepting the ambient sound 205 and a second aperture 294 to allow the personal sound 255 to be output into the user's outer ear canal. The housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

The microphone 210 converts the ambient sound 205 into an electrical signal that is amplified by preamplifier 215 and converted into an ambient audio stream 222 by A/D converter 220. In this context, the term "stream" means a sequence of digital samples. The "ambient audio stream" is a sequence of digital samples representing the ambient sound received by the active acoustic filter 200. The ambient audio stream 222 may be processed by processor 230 to provide a personal audio stream 232. The processing performed by the processor 230 will be discussed in more detail subsequently. The personal audio stream 232 is converted into an analog signal by D/A converter 240. The analog signal output from D/A converter 240 is amplified by amplifier 245 and converted into personal sound 255 by speaker 250.

The microphone 210 may be one or more transducers for converting sound into an electrical signal that is sufficiently compact for use within the housing 290. The preamplifier 215 may be configured to amplify the electrical signal output from the microphone 210 to a level compatible with the input of the A/D converter 220. The preamplifier 215 may be integrated into the A/D converter 220, which, in turn, may be integrated with the processor 230. In the situation where the active acoustic filter 200 contains more than one microphone, a separate preamplifier may be provided for each microphone.

The A/D converter 220 may digitize the output from preamplifier 215, which is to say convert the output from preamplifier 215 into a series of digital ambient audio samples at a rate at least twice the highest frequency present in the ambient sound. For example, the A/D converter may output the ambient audio stream 222 in the form of sequential audio samples at rate of 40 kHz or higher. The resolution of the ambient audio stream 222 (i.e. the number of bits in each audio sample) may be sufficient to minimize or avoid audible sampling noise in the processed output sound 255. For example, the A/D converter 220 may output an ambient audio stream 222 having 12 bits, 14, bits, or even higher resolution. In the situation where the active acoustic filter 200 contains more than one microphone with respective preamplifiers, the outputs from the preamplifiers may be digitized separately, or the outputs of some or all of the preamplifiers may be combined prior to digitization.

The wireless interface 225 may provide digital acoustic filter 200 with a connection to one or more wireless networks 295 using a limited-range wireless communications protocol such as Bluetooth®, WiFi®, ZigBee®, or other wireless personal area network protocol. The wireless interface 225 may be used to receive data such as parameters for use by the processor 230 in processing the ambient audio stream 222 to produce the personal audio stream 232. The wireless interface 225 may be used to receive a secondary audio feed. The wireless interface 225 may be used to export the personal audio stream 232, which is to say transmit the personal audio stream 232 to a device external to the active acoustic filter 200. The external device may then, for example, store and/or publish the personal audio stream, for example via social media.

The processor 230 may include one or more processor devices such as a microcontroller, a microprocessor, and/or a digital signal processor. The processor 230 can include and/or be coupled to the memory 235. The memory 235 may store software programs, which may include an operating system, for execution by the processor 230. The memory 235 may also store data for use by the processor 230. The data stored in the memory 235 may include, for example, digital sound samples and intermediate results of processes performed on the ambient audio stream 222. The data stored in the memory 235 may also include a user's listening preferences, and/or rules and parameters for applying particular processes to convert the ambient audio stream 222 into the personal audio stream 232. The memory 235 may include a combination of read-only memory, flash memory, and static or dynamic random access memory.

The D/A converter 240 may convert the personal audio stream 232 from the processor 230 into an analog signal. The processor 230 may output the personal audio stream 232 as a series of samples typically, but not necessarily, at the same rate as the ambient audio stream 222 is generated by the A/D converter 220. The analog signal output from the D/A converter 240 may be amplified by the amplifier 245 and converted into personal sound 255 by the speaker 250. The amplifier 245 may be integrated into the D/A converter 240, which, in turn, may be integrated with the processor 230. The speaker 250 can be any transducer for converting an electrical signal into sound that is suitably sized for use within the housing 290.

The battery (not shown) may provide power to various elements of the active acoustic filter 200. The battery may be, for example, a zinc-air battery, a lithium ion battery, a lithium polymer battery, a nickel cadmium battery, or a battery using some other technology.

The depiction in FIG. 2 of the active acoustic filter 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the processor 230, the memory 235, the analog signal by digital-to-analog (D/A) converter 240, the amplifier 245, and the wireless interface 225 may be contained within a common signal processor circuit device.

Figure 3:
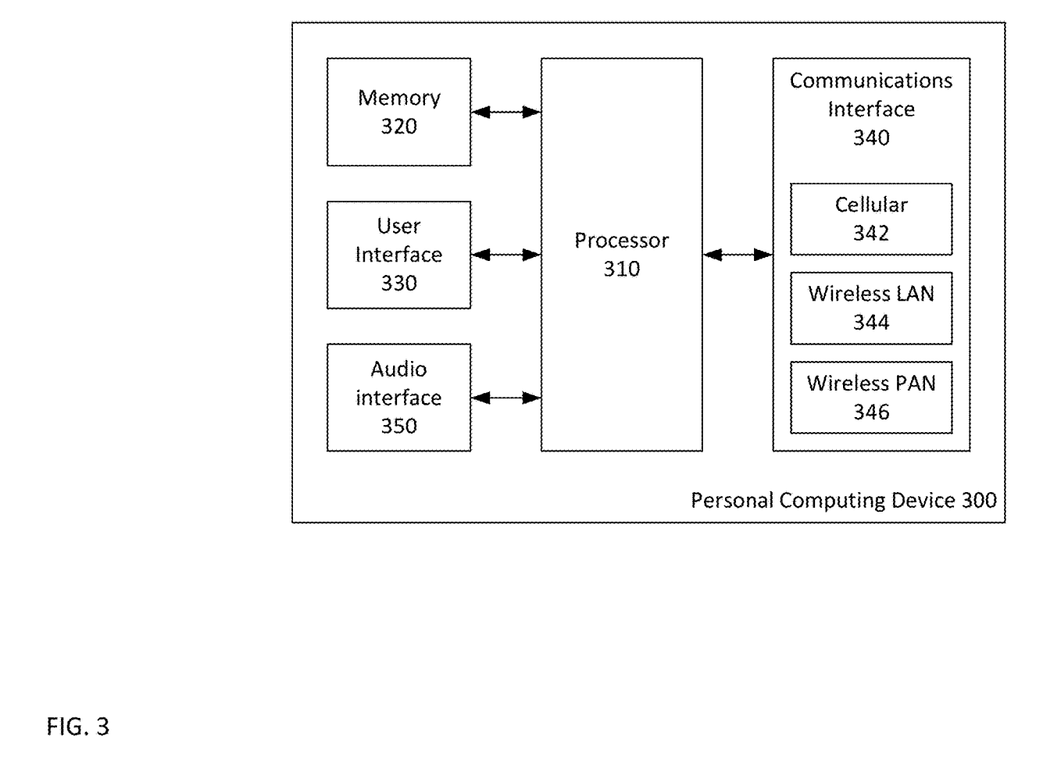
FIG. 3 is a block diagram of a personal computing device.

FIG. 3 is a block diagram of an exemplary personal computing device 300, which may be the personal computing device 120. As shown in FIG. 3, the personal computing device 300 includes a processor 310, memory 320, a user interface 330, a communications interface 340, and an audio interface 350. Some of these elements may or may not be present, depending on the implementation. Further, although these elements are shown independently of one another, each may, in some cases, be integrated into another.

The processor 310 may be or include one or more microprocessors, microcontrollers, digital signal processors, application specific integrated circuits (ASICs), or a system-on-a-chip (SOCs). The memory 320 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 320 may store software programs and routines for execution by the processor. These stored software programs may include an operating system such as the Apple® or Android® operating systems. The operating system may include functions to support the communications interface 340, such as protocol stacks, coding/decoding, compression/decompression, and encryption/decryption. The stored software programs may include an application or "app" to cause the personal computing device to perform portions of the processes and functions described herein.

The user interface 330 may include a display and one or more input devices such as a touch screen.

The communications interface 340 includes at least one interface for wireless communication with external devices.

The communications interface 340 may include one or more of a cellular telephone network interface 342, a wireless Local Area Network (LAN) interface 344, and/or a wireless personal area network (PAN) interface 336. The cellular telephone network interface 342 may use one or more of the known 2G, 3G, and 4G cellular data protocols. The wireless LAN interface 344 may use the WiFi® wireless communication protocol or another wireless local area network protocol. The wireless PAN interface 346 may use a limited-range wireless communication protocol such as Bluetooth®, Wi-Fi®, ZigBee®, or some other public or proprietary wireless personal area network protocol. When the personal computing device is deployed as part of an personal audio system, such as the personal audio system 140, the wireless PAN interface 346 may be used to communicate with the active acoustic filter devices 110L, 110R. The cellular telephone network interface 342 and/or the wireless LAN interface 344 may be used to communicate with the cloud 130.

The communications interface 340 may include radio-frequency circuits, analog circuits, digital circuits, one or more antennas, and other hardware, firmware, and software necessary for communicating with external devices. The communications interface 340 may include one or more processors to perform functions such as coding/decoding, compression/decompression, and encryption/decryption as necessary for communicating with external devices using selected communications protocols. The communications interface 340 may rely on the processor 310 to perform some or all of these function in whole or in part.

The audio interface 350 may be configured to both input and output sound. The audio interface 350 may include more or more microphones, preamplifiers, and A/D converters that perform similar functions as the microphone 210, preamplifier 215, and A/D converter 220 of the active acoustic filter 200. The audio interface 350 may include more or more D/A converters, amplifiers, and speakers that perform similar functions as the D/A converter 240, amplifier 245, and speaker 250 of the active acoustic filter 200.

Figure 4:
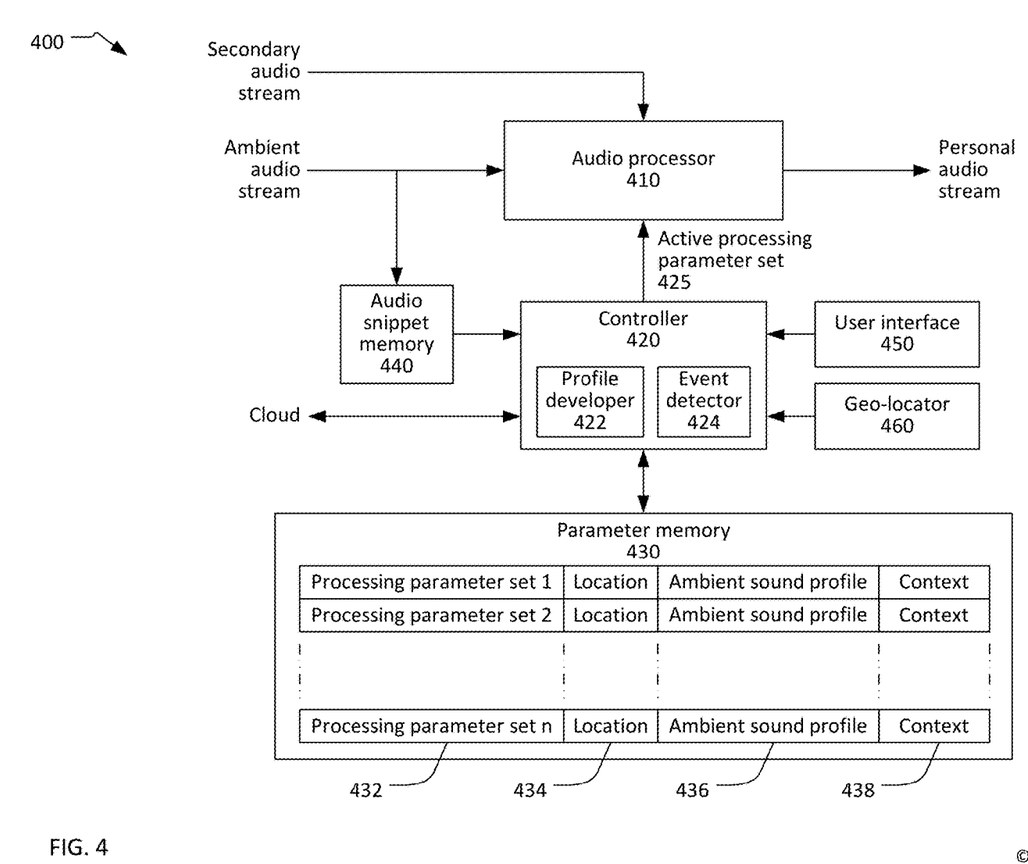
FIG. 4 is a functional block diagram of a portion of a personal audio system.

FIG. 4 shows a functional block diagram of a portion of an exemplary personal audio system 400, which may be the personal audio system 140. The personal audio system 400 may include one or two active acoustic filters, such as the active acoustic filters 110L, 110R, and a personal computing device, such as the personal computing device 120. The functional blocks shown in FIG. 4 may be implemented in hardware, by software running on one or more processors, or by a combination of hardware and software. The functional blocks shown in FIG. 4 may be implemented within the personal computing device, or within one or both active acoustic filters, or may be distributed between the personal computing device and the active acoustic filters.

The personal audio system 400 includes an audio processor 410, a controller 420, a dataset memory 430, an audio snippet memory 440, a user interface 450, and a geo-locator 460. The audio processor 410 and/or the controller 420 may include additional memory, which is not shown, for storing program instructions, intermediate results, and other data.

The audio processor 410 may be or include one or more microprocessors, microcontrollers, digital signal processors, application specific integrated circuits (ASICs), or a system-on-a-chip (SOCs). The audio processor 410 may be located within an active acoustic filter, within the personal computing device, or may be distributed between a personal computing device and one or two active acoustic filters.

The audio processor 410 receives and processes a digital ambient audio stream, such as the ambient audio stream 222, to provide a personal audio stream, such as the personal audio stream 232. The audio processor 410 may perform processes including filtering, equalization, compression, limiting, and/or other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that louder frequency bands are attenuated more than softer frequency bands. Limiting may be used to attenuate louder sounds to a predetermined loudness level without attenuating softer sounds. Limiting may be combined with filtering or with equalization such that louder frequency bands are attenuated to a defined level while softer frequency bands are not attenuated or attenuated by a smaller amount. Techniques for implementing filters, limiters, compressors, and limiters are known to those of skill in the art of digital signal processing.

The audio processor 410 may also add echo or reverberation to the ambient audio stream. The audio processor 410 may also detect and cancel an echo in the ambient audio stream. The audio processor 410 may further perform noise reduction processing. Techniques to add or suppress echo, to add reverberation, and to reduce noise are known to those of skill in the art of digital signal processing.

The audio processor may receive a secondary audio stream. The audio processor may incorporate the secondary audio stream into the personal audio stream. For example, the secondary audio stream may be added to the ambient audio stream before processing, after all processing of the ambient audio stream is performed, or at an intermediate stage in the processing of the ambient audio stream. The secondary audio stream may not be processed, or may be processed in the same manner as or in a different manner than the ambient audio stream.

The audio processor 410 may process the ambient audio stream, and optionally the secondary audio stream, in accordance with an active processing parameter set 425. The active processing parameter set 425 may define the type and degree of one or more processes to be performed on the ambient audio stream and, when desired, the secondary audio stream. The active processing parameter set may include numerical parameters, filter models, software instructions, and other information and data to cause the audio processor to perform desired processes on the ambient audio stream. The extent and format of the information and data within active processing parameter set 425 may vary depending on the type of processing to be performed. For example, the active processing parameter set 425 may define filtering by a low pass filter with a particular cut-off frequency (the frequency at which the filter start to attenuate) and slope (the rate of change of attenuation with frequency) and/or compression using a particular function (e.g. logarithmic). For further example, the active processing parameter set 425 may define the plurality of frequency bands for equalization and provide a respective attenuation or gain for each frequency band. In yet another example, the processing parameters may define a delay time and relative amplitude of an echo to be added to the digitized ambient sound.

The audio processor 410 may receive the active processing parameter set 425 from the controller 420. The controller 420, in turn, may obtain the active processing parameter set 425 from the user via the user interface 450, from the cloud (e.g. from the sound knowledgebase 150 or another device within the cloud), or from a parameter memory 430 within the personal audio system 400.

The parameter memory 430 may store one or more processing parameter sets 432, which may include a copy of the active processing parameter set 425. The parameter memory 430 may store dozens or hundreds or an even larger number of processing parameter sets 432. Each processing parameter set 432 may be associated with at least one indicator, where an "indicator" is data indicating conditions or circumstances where the associated processing parameter set 432 is appropriate for selection as the active processing parameter set 425. The indicators associated with each processing parameter set 432 may include one or more of a location 434, an ambient sound profile 436, and a context 438.

Locations 434 may be associated with none, some, or all of the processing parameter sets 432 and stored in the parameter memory 430. Each location 434 defines a geographic position or limited geographic area where the associated set of processing parameters 432 is appropriate. A geographic position may be defined, for example, by a street address, longitude and latitude coordinates, GPS coordinates, or in some other manner. A geographic position may include fine-grained information such as a floor or room number in a building. A limited geographic area may be defined, for example, by a center point and a radius, by a pair of coordinates identifying diagonal corners of a rectangular area, by a series of coordinates identifying vertices of a polygon, or in some other manner.

Ambient sound profiles 436 may be associated with none, some, or all of the processing parameter sets 432 and stored in the parameter memory 430. Each ambient sound profile 436 defines an ambient sound environment in which the associated processing parameter set 432 is appropriate. Each ambient sound profile 436 may define the ambient sound environment by a finite number of numerical values. For example, an ambient profile may include numerical values for some or all of an overall loudness level, a normalized or absolute loudness of predetermined frequency bands, a spectral envelop shape, spectrographic features such as rising or falling pitch, frequencies and normalized or absolute loudness levels of dominant narrow-band sounds, an indicator of the presence or absence of odd and/or even harmonics, a normalized or absolute loudness of noise, a low frequency periodicity (e.g. the "beat" when the ambient sound includes music), and numerical values quantifying other characteristics.

Contexts 438 may be associated with none, some, or all of the processing parameter sets 432 and stored in the parameter memory 430. Each context 438 names an environment or situation in which the associated processing parameter set 432 is appropriate. A context may be considered as the name of the associated processing parameter set. Examples of contexts include "airplane cabin," "subway," "urban street," "siren," and "crying baby." A context is not necessarily associated with a specific geographic location, but may be associated with a generic location such as, for example, "airplane," "subway," and "urban street." A context may be associated with a type of ambient sound such as, for example, "siren," "crying baby," and "rock concert." A context may be associated with one or more sets of processing parameters. When a context is associated with multiple processing parameter sets 432, selection of a particular processing parameter set may be based on location or ambient sound profile. For example, "siren" may be associated with a first set of processing parameters for locations in the United States and a different set of processing parameters for locations in Europe.

The controller 420 may select a parameter set 432 for use as the active processing parameter set 425 based on location, ambient sound profile, context, or a combination thereof. Retrieval of a processing parameter set may be requested by the user via a user interface 450. Alternatively or additionally, retrieval of a processing parameter set may be initiated automatically by the controller 420. For example, the controller 420 may include a profile developer 422 to analyze the ambient audio stream to develop a current ambient sound profile. The controller 420 may compare the current ambient sound profile with a stored prior ambient sound profile. When the current ambient sound profile is judged, according to first predetermined criteria, to be substantially different from the prior ambient sound profile, the controller 420 may initiate retrieval of a new set of processing parameters.

The personal audio system 400 may contain a geo-locator 460. The geo-locator 460 may determine a geographic location of the personal audio system 400 using GPS, cell tower triangulation, or some other method. As described in co-pending patent application Ser. No. 14/681,843, entitled "Active Acoustic Filter with Location-Based Filter Characteristics," the controller 420 may compare the geographic location of the personal audio system 400, as determined by the geo-location 460, with location indicators 434 stored in the parameter memory 430. When one of the location indicators 434 matches, according to second predetermined criteria the geographic location of the personal audio system 400, the associated processing parameter set 432 may be retrieved and provided to the audio processor 410 as the active processing parameter set 425.

As described in co-pending patent application Ser. No. 14/819,298, entitled "Active Acoustic Filter with Automatic Selection of Filter Parameters Based on Ambient Sound," the controller may select a set of processing parameters based on the ambient sound. The controller 420 may compare the profile of the ambient sound, as determined by the profile developer 422, with profile indicators 436 stored in the parameter memory 430. When one of the profile indicators 436 matches, according to third predetermined criteria, the profile of the ambient sound, the associated processing parameter set 432 may be retrieved and provided to the audio processor 410 as the active processing parameter set 425.

In some circumstances, for example upon user request or when a matching location or profile is not found in the parameter memory 430, the controller may present a list of the contexts 438 on a user interface 450. A user may then manually select one of the listed contexts and the associated processing parameter set 432 may be retrieved and provided to the audio processor 410 as the active processing parameter set 425. For example, assuming the user interface includes a display with a touch screen, the list of contexts may be displayed on the user interface as array of soft buttons. The user may then select one of the contexts by pressing the associated button.

Processing parameter sets 432 and associated indicators 434, 436, 438 may be stored in the parameter memory 430 in several ways. Processing parameter sets 432 and associated indicators 434, 436, 438 may have been stored in the parameter memory 430 during manufacture of the personal audio system 400. Processing parameter sets 432 and associated indicators 434, 436, 438 may have been stored in the parameter memory 430 during installation of an application or "app" on the personal computing device that is a portion of the personal audio system.

Additional processing parameter sets 432 and associated indicators 434, 436, 438 stored in the parameter memory 430 may have been created by the user of the personal audio system 400. For example, an application running on the personal computing device may present a graphical user interface through which the user can select and control parameters to edit an existing processing parameter set and/or to create a new processing parameter set. In either case, the edited or new processing parameter set may be saved in the parameter memory 430 in association with one or more of a current ambient sound profile provided by the profile developer 422, a location of the personal audio system 400 provided by the geo-locator 460, and a context or name entered by the user via the user interface 450. The edited or new processing parameter set to be saved in the parameter memory 430 automatically or in response to a specific user command.

Processing parameter sets and associated indicators may be developed by third parties and made accessible to the user of the personal audio system 400, for example, via a network.

Further, processing parameter sets 432 and associated indicators 434, 436, 438 may be downloaded from a remote device, such as the sound knowledgebase 150 in the cloud 130, and stored in the parameter memory 430. For example, newly available or revised processing parameter sets 432 and associated indicators 434, 436, 438 may be pushed from the remote device to the personal audio system 400 automatically. Newly available or revised processing parameter sets 432 and associated indicators 434, 436, 438 may be downloaded by the personal audio system 400 at periodic intervals. Newly available or revised processing parameter sets 432 and associated indicators 434, 436, 438 may be downloaded by the personal audio system 400 in response to a request from a user.

To support development of new and/or revised processing parameter sets, the personal audio system may upload information to a remote device, such as the sound knowledgebase 150 in the cloud 130.

The personal audio system may contain an audio snippet memory 440. The audio snippet memory 440 may be, for example, a revolving or circular buffer memory having a fixed size where the newest data overwrites the oldest data such that, at any given instant, the buffer memory stores a predetermined amount of the most recently stored data. The audio snippet memory 440 may store a "most recent portion" of an audio stream, where the "most recent portion" is the time period immediately preceding the current time. The audio snippet memory 440 may store the most recent portion of the ambient audio stream input to the audio processor 410 (as shown in FIG. 4), in which case the audio snippet memory 440 may be located within one or both of the active acoustic filters of the personal audio system. The audio snippet memory 440 may store the most recent portion of an audio stream derived from the audio interface 350 in the personal computing device of the personal audio system, in which case the audio snippet memory may be located within the personal computing device 120.

In either case, the duration of the most recent portion of the audio stream stored in the audio snippet memory 440 may be sufficient to capture very low frequency variations in the ambient sound such as, for example, periodic frequency modulation of a siren or interruptions in a baby's crying when the baby inhales. The audio snippet memory 440 may store, for example, the most recent audio stream data for a period of 2 seconds, 5 seconds, 10 seconds, 20 seconds, or some other period.

The personal audio system my include an event detector 424 to detect trigger events, which is to say events that trigger uploading the content of the audio snippet memory and associated metadata to the remote device. The event detector 424 may be part of, or coupled to, the controller 420. The event detector 424 may detect events that indicate or cause a change in the active processing parameter set 425 used by the audio processor 410 to process the ambient audio stream. Examples of such events detected by the event detector include the user entering commands via the user interface 450 to modify the active processing parameter set 425 or to create a new processing parameter set; the user entering a command via the user interface 450 to save a modified or new processing parameter set in the parameter memory 430; automatic retrieval, based on location or ambient sound profile, of a selected processing parameter set from the parameter memory 430 for use as the active processing parameter set; and user selection, for example from a list or array of buttons presented on the user interface 450, of a selected processing parameter set from the parameter memory 430 for use as the active processing parameter set. Such events may be precipitated by a change in the ambient sound environment or by user dissatisfaction with the sound of the personal audio stream obtained with the previously-used active processing parameter set.

In response to the event detector 424 detecting a trigger event, the controller 420 may upload the most recent audio snippet (i.e. the content of the audio snippet memory) and associated metadata to the remote device. The uploaded metadata may include a location of the personal audio system 400 provided by the geo-locator 460. When the trigger event was a user-initiated or automatic retrieval of a selected processing parameter set from the parameter memory, the uploaded metadata may include an identifier of the selected processing parameter set and/or the complete selected processing parameter set. When the trigger event was the user modifying a processing parameter set or creating a new processing parameter set, the uploaded metadata may include the modified or new processing parameter set. Further, the user may be prompted or required to enter, via the user interface 450, a context, descriptor, or other tag to be associated with the modified or new processing parameter set and uploaded.

Figure 5:
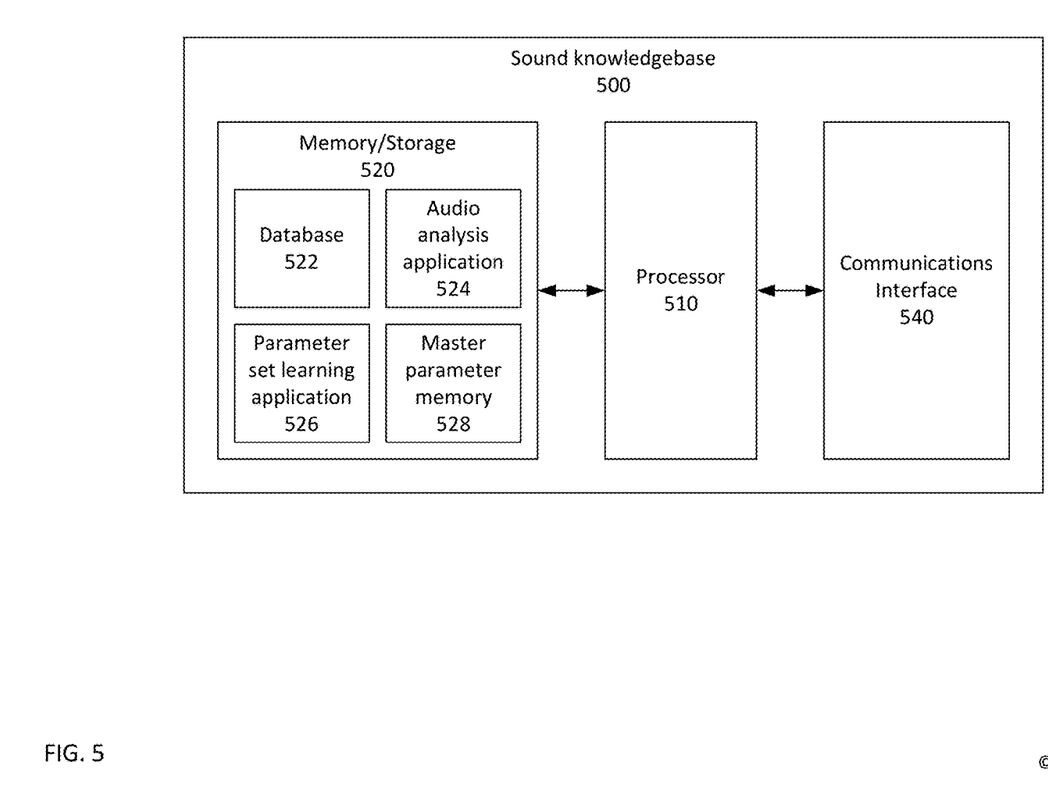
FIG. 5 is a block diagram of a sound knowledgebase.

FIG. 5 is a functional block diagram of an exemplary sound knowledgebase 500, which may be the sound knowledgebase 150 within the sound processing system 100. The term "knowledgebase" connotes a system that not only store data, but also learns and stores other knowledge derived from the data. The sound knowledgebase 500 includes a processor 510 coupled to a memory/storage 520 and a communications interface 540. These functions may be implemented, for example, in a single server computer or by one or more real or virtual servers within the cloud.

The processor 510 may be or include one or more microprocessors, microcontrollers, digital signal processors, application specific integrated circuits (ASICs), or a system-on-a-chip (SOCs). The memory/storage 520 may include a combination of volatile and/or non-volatile memory including read-only memory (ROM), static, dynamic, and/or magnetoresistive random access memory (SRAM, DRM, MRAM, respectively), and nonvolatile writable memory such as flash memory. The memory/storage 520 may include one or more storage devices that store data on fixed or removable storage media. Examples of storage devices include magnetic disc storage devices and optical disc storage devices. The term "storage media" means a physical object adapted for storing data, which excludes transitory media such as propagating signals or waves. Examples of storage media include magnetic discs and optical discs.

The communications interface 540 includes at least one interface for wired or wireless communications with external devices including the plurality o personal audio systems.

The memory/storage 520 may store a database 522 having a plurality of records. Each record in the database 522 may include a respective audio snippet and associated metadata received from one of a plurality of personal audio systems such as the personal audio system 400) via the communication interface 540. The memory/storage 520 may also store software programs and routines for execution by the processor. These stored software programs may include an operating system (not shown) such as the Apple®, Windows®, Linux®, or Unix® operating systems. The operating system may include functions to support the communications interface 540, such as protocol stacks, coding/decoding, compression/decompression, and encryption/decryption. The stored software programs may include a database application (also not shown) to manage the database 522.

The stored software programs may include an audio analysis application 524 to analyze audio snippets received from the plurality of personal audio systems. The audio analysis application 524 may develop audio profiles of the audio snippets. Audio profiles developed by the audio analysis application 524 may be similar to the profiles developed by the profile developer 422 in each personal audio system. Audio profiles developed by the audio analysis application 524 may have a greater level of detail compared to profiles developed by the profile developer 422 in each personal audio system. Audio profiles developed by the audio analysis application 524 may include features, such as low frequency modulation or discontinuities, not considered by the profile developer 422 in each personal audio system. Audio profiles and other features extracted by the audio analysis application 524 may be stored in the database 522 as part of the record containing the corresponding audio snippet and metadata.

The stored software programs may include a parameter set learning application 526 to learn revised and/or new processing parameter sets from the snippets, audio profiles, and metadata stored in the database 522. The parameter set learning application 526 may use a variety of analytical techniques to learn revised and/or new processing parameter sets. These analytical techniques may be applied to numerical and statistical analysis of snippets, audio profiles, and numerical metadata such as location, date, and time metadata. These analytical techniques may include, for further example, semantic analysis of tags, descriptors, contexts, and other non-numerical metadata. Further, the parameter set learning application 526 may use known machine learning techniques such as neural nets, fuzzy logic, adaptive neuro-fuzzy inference systems, or combinations of these and other machine learning methodologies to learn revised and/or new processing parameter sets.

As an example of a learning process that may be performed by the parameter set learning application 526, the records in the database 522 may be sorted into a plurality of clusters based according to audio profile, location, tag or descriptor, or some other factor. Some or all of these clusters may optionally be sorted into sub-clusters based on another factor. When records are sorted into clusters or sub-clusters based on non-numerical metadata (e.g. tags or descriptors)

semantic analysis may be used to combine like metadata into a manageable number of clusters or sub-clusters. A consensus processing parameter set may then be developed for each cluster or sub-cluster. For example, clear outliers may be discarded and the consensus processing parameter set may be formed from the medians or means of processing parameters within the remaining processing parameter sets.

The memory/storage 520 may include a master parameter memory 528 to store all parameter memory sets and associated indicators currently used within the sound processing system 100. New or revised processing parameter sets developed by the parameter set learning application 526 may be stored in the master parameter memory 528. Some or all of the processing parameter sets stored in the master parameter memory 528 may be downloaded via the communications interface 540 to each of the plurality of personal audio systems in the sound processing system 100. For example, new or recently revised processing parameter sets may be pushed to some or all of the personal audio systems as available. Processing parameters sets, including new and revised processing parameter sets may be downloaded to some or all of the personal audio systems at periodic intervals. Processing parameters sets, including new and revised processing parameter sets may be downloaded upon request from individual personal audio systems.

Description of Processes

Figure 6:
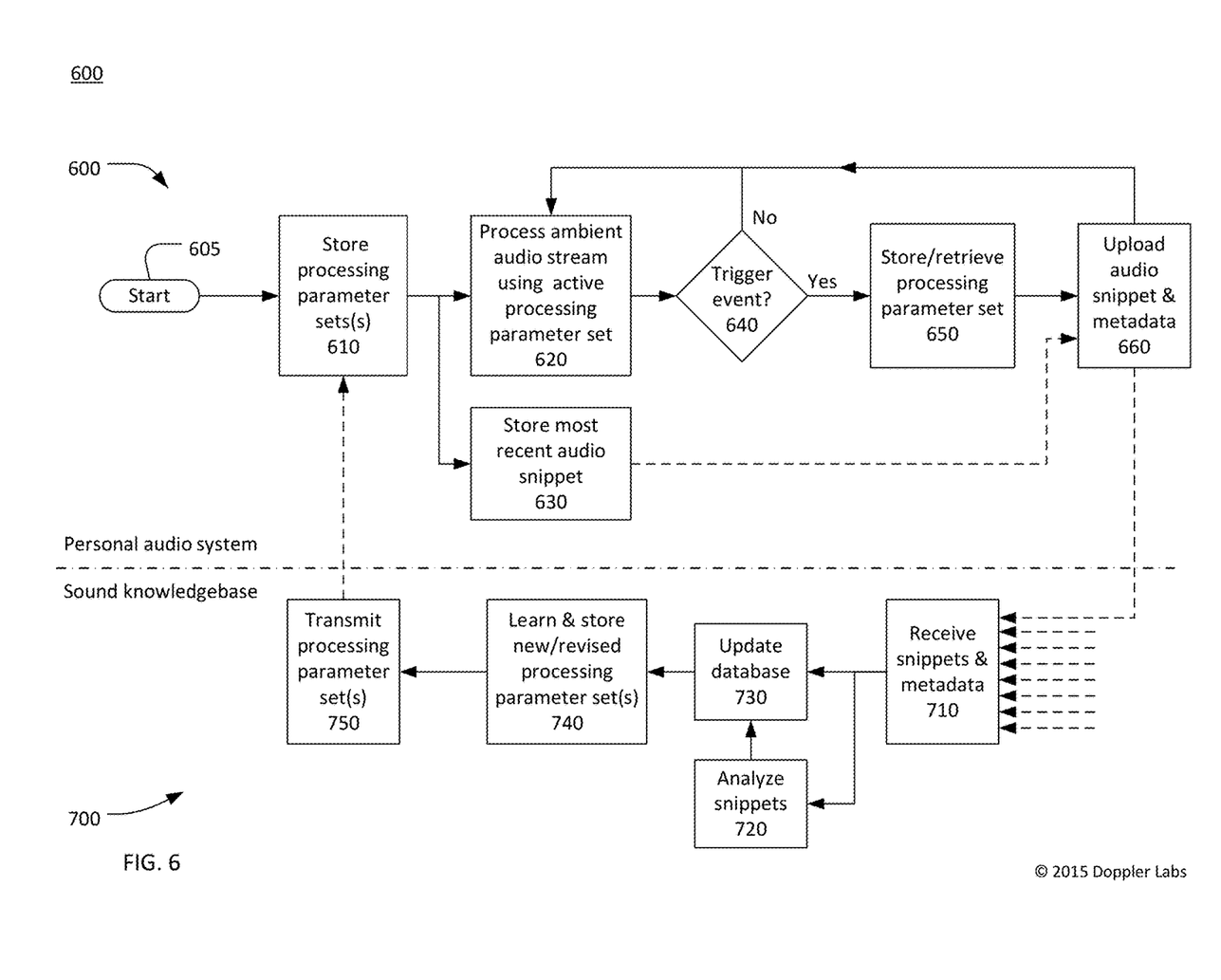
FIG. 6 is a flow chart of a method for processing sound using collective feedforward.

FIG. 6 shows flow charts of methods 600 and 700 for processing sound using collective feedforward. The methods 600 and 700 may be performed by a sound processing system, such as the sound processing system 100, which may include at least one personal audio system, such as the personal audio system 140, and a sound knowledgebase, such as the sound knowledgebase 150 in the cloud 130. The sound processing system may include a large plurality of personal audio systems. Specifically, the method 600 may be performed by each personal audio system concurrently but not necessarily synchronously. The method 700 may be performed by the sound knowledgebase concurrently with the method 600. All or portions of the methods 600 and 700 may be performed by hardware, by software running on one or more processors, or by a combination of hardware and software. Although shown as a series of sequential actions for ease of discussion, it must be understood that the actions from 710 to 750 may occur continuously and simultaneously, and that the actions from 610 to 660 may be performed concurrently by the plurality of personal audio systems. Further, in FIG. 6, process flow is indicated solid arrows and information flow is indicated by dashed arrows.

The method 600 may start at 605 and run continuously until stopped (not shown). At 610, one or more processing parameter sets may be stored in a parameter memory, such as the parameter memory 430, within the personal audio system. Initially, one or more processing parameter sets may be stored in the personal audio system during manufacture or during installation of a personal audio system application on a personal computing device. Subsequently, new and/or revised processing parameter sets may be received from the sound knowledgebase.

At 620, an ambient audio stream derived from ambient sound may be processed in accordance with an active processing parameter set selected from the processing parameters sets stored at 610. Processes that may be performed at 620 were previous described. Concurrently with processing the ambient audio stream at 620, a most recent portion of the ambient audio stream may be stored in a snippet memory at 630, also as previously described.

At 640, a determination may be made whether or not a trigger event has occurred. A trigger event may be any event that causes a change of or to the active processing parameter set used at 620 to process the ambient audio stream. Examples of events detected by the event detector include a user entering commands via a user interface to modify the active processing parameter or to create a new processing parameter set, the user entering a command via the user interface to save a modified or to new processing parameter set in the parameter memory, and user-initiated or automatic decision to retrieve a different processing parameter set from the parameter memory for use at 620 as the active processing parameter set.

When a determination is made at 640 that a trigger event has not occurred ("no" at 640), the processing at 620 and storing at 630 may continue. When a determination is made at 640 that a trigger event has occurred ("yes" at 640), a processing parameter set may be stored or retrieved at 650 as appropriate. The storage/retrieval of the processing parameter set 650 is either the storage of the current processing parameter set, for example, as selected by a user, in parameter memory 430. The retrieval is accessing of one or more parameter set into parameter memory 430.

At 660, the most recent audio snippet (i.e. the content of the audio snippet memory) and associated metadata may be transmitted or uploaded to the sound knowledgebase. The uploaded metadata may include a location of the personal audio system provided by a geo-locator within the personal audio system. When the trigger event was a user-initiated or automatic retrieval of a selected processing parameter set from the parameter memory, the uploaded metadata may include an identifier of the selected processing parameter set and/or the actual selected processing parameter set. When the trigger event was the user modifying the active processing parameter or creating a new processing parameter set, the uploaded metadata may include the modified or new processing parameter set. Further, the user may be prompted to enter a context, descriptor, or other tag to be associated with the modified or new processing parameter set and uploaded. The process 600 may then return to 620 and continue cyclically until stopped.

At 710, the sound knowledgebase receives the audio snippet and associate metadata transmitted at 660 and may receive additional audio snippets and metadata from other personal audio systems. In addition, any audio profiles developed by the personal audio systems may be shared with the sound knowledgebase. Audio analysis may be performed on the received audio snippets at 720. The audio analysis at 720 may develop audio profiles of the audio snippets. Audio profiles developed by the audio analysis at 720 may be similar to the profiles developed by the profile developer 422 in each personal audio system as previous described. Audio profiles developed by the audio analysis at 720 may have a greater level of detail compared to profiles developed within each personal audio system. Audio profiles developed by audio analysis at 720 may include features, such as low frequency modulation or discontinuities, not considered in the profiles developed within each personal audio system. Audio profiles and other features extracted by the audio analysis at 720 may be stored in a database at 730 in association with the corresponding audio snippet and metadata from 710.

At 740, machine learning techniques may be applied to learn revised and/or new processing parameter sets from the snippets, audio profiles, and metadata stored in the database 730. A variety of analytical techniques may be used to learn revised and/or new processing parameter sets. These analytical techniques may include, for example, numerical and statistical analysis of snippets, audio profiles, and numerical metadata such as location, date, and time metadata. These analytical techniques may include, for further example, semantic analysis of tags, descriptors, contexts, and other non-numerical metadata.

As an example of a learning process that may be performed at 740, some or all of the records in the database at 730 may be sorted into a plurality of clusters based according to audio profile, location, tag or descriptor, or some other factor. Some or all of these clusters may optionally be sorted into sub-clusters based on another factor. When records are sorted into clusters or sub-clusters based on non-numerical metadata (e.g. tags or descriptors) semantic analysis may be used to combine like metadata into a manageable number of clusters or sub-clusters. A consensus processing parameter set may then be developed for each cluster or sub-cluster. For example, clear outliers may be discarded and the consensus processing parameter set may be formed from the medians or means of processing parameters within the remaining processing parameter sets.

New or revised processing parameter sets learned and stored at 740 may be transmitted to some or all of the plurality of personal audio systems at 750. For example, new or recently revised processing parameter sets may be pushed to some or all of the personal audio systems on an as-available basis, which is to say as soon as the new or recently revised processing parameter sets are created. Processing parameters sets, including new and revised processing parameter sets may be transmitted to some or all of the personal audio systems at predetermined periodic intervals, such as, for example, nightly, weekly, or at some other interval. Processing parameters sets, including new and revised processing parameter sets may be transmitted upon request from individual personal audio systems. Processing parameter sets may be pushed to, or downloaded by, a personal audio system based on a change in the location of the personal audio system. For example, a personal audio system that relocates to a position near or in an airport may receive one or more processing parameters sets for use suppressing aircraft noise.

The overall process of learning new or revised processing parameter sets based on audio snippets and metadata and providing those new or revised processing parameter sets to personal audio systems is referred to herein as "collective feedforward". The term "collective" indicates the new or revised processing parameter sets are learned from the collective inputs from multiple personal audio systems. The term "feedforward" (in contrast to "feedback") indicates new or revised processing parameter sets are provided, or fed forward, to personal audio systems that may not have contributed snippets and metadata to the creation of those new or revised processing parameter sets.

Information collected by the sound knowledgebase about how personal audio systems are used in different locations, ambient sound environments, and situations may be useful for more than developing new or revised processing parameter sets. In particular, information received from users of personal audio systems may indicate a degree of satisfaction with an ambient sound environment. For example, information may be collected from personal audio systems at a concert to gauge listener satisfaction with the "house" sound. If all or a large portion of the personal audio systems were used to substantially modify the house sound, a presumption may be made that the audience (those with and without personal audio systems) was not satisfied. Information received from personal audio systems could be used similarly to gauge user satisfaction with the sound and noise levels within stores, restaurants, shopping malls, and the like. Information received from personal audio systems could also be used to create soundscapes or sound level maps that may be helpful, for example, for urban planning and traffic flow engineering.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A personal audio system, comprising:
   a housing;
   a microphone, a preamplifier, and an analog to digital converter to convert ambient sound into an ambient audio stream;
   a processor to generate a personal audio stream by processing the ambient audio stream in accordance with an active processing parameter set, wherein the active processing parameter set indicates a type and degree of one or more processes to be performed on the ambient audio stream to modify a manner in which a user of the personal audio system hears the ambient audio stream, wherein the personal audio stream is a modified version of the ambient audio stream;
   a buffer memory to store a most recent snippet of the ambient audio stream;
   an event detector to detect a trigger event from a set of trigger events, wherein at least one of the trigger events indicates or causes a change in the active processing parameter set; and
   a controller configured to, in response to detection of the at least one of the trigger events, upload from the buffer memory the most recent snippet of the ambient audio stream and associated metadata to a knowledgebase remote from the personal audio system, wherein the knowledgebase remote from the personal audio system analyzes the most recent snippet of the ambient audio stream, wherein the most recent snippet of the ambient audio stream comprises a duration of the ambient audio stream that occurs immediately preceding the trigger event; and a digital to analog converter, an amplifier, and a speaker to convert the personal audio stream into personal output sound, wherein the microphone, the preamplifier, the analog to digital converter, the processor, the digital to analog converter, the amplifier, and the speaker are disposed within the housing.

2. The personal audio system of claim 1, wherein
at least one of the trigger events is receiving, via a user interface, a command to modify the active processing parameter set, and
the metadata transmitted to the knowledgebase includes the active processing parameter set after modification.

3. The personal audio system of claim 1, further comprising:
a parameter memory that stores one or more processing parameter sets.

4. The personal audio system of claim 3, wherein
at least one of the trigger events is receiving, via a user interface, a command to store the active processing parameter set in the parameter memory, and
the metadata transmitted to the knowledgebase includes the active processing parameter set.

5. The personal audio system of claim 3, wherein
at least one of the trigger events is retrieving a selected processing parameter set from the parameter memory for use as the active processing parameter set.

6. The personal audio system of claim 5, further comprising:
a profile developer to develop a profile of the ambient audio stream,
wherein the selected processing parameter set retrieved from the parameter memory is selected based on the profile of the ambient audio stream.

7. The personal audio system of claim 5, further comprising:
a geo-locator to determine a location of the personal audio system, wherein
wherein the processing parameter set retrieved from the parameter memory is selected based on the location of the personal audio system.

8. The personal audio system of claim 1, wherein
the metadata transmitted to the knowledgebase includes a descriptor received from a issuer via a user interface.

9. The personal audio system of claim 1, further comprising:
a geo-locator to determine a location of the personal audio system, wherein
the metadata transmitted to the knowledgebase includes data indicating the location of the personal audio system.

10. The personal audio system of claim 1, wherein the controller is further configured to
receive, from the knowledgebase, one or more processing parameter sets derived by the knowledgebase from snippets and associated metadata received by the knowledgebase from a plurality of personal audio systems, and
store the one or more processing parameter sets received from the knowledgebase in a parameter memory.

11. The personal audio system of claim 1, wherein:
the housing is an earbud housing configured to fit, at least partially, within and be supported by a user's ear.

12. A method for processing ambient sound in a personal audio system, comprising:
generating a personal audio stream by processing an ambient audio stream in accordance with an active processing parameter set, wherein the active processing parameter set indicates a type and degree of one or more processes to be performed on the ambient audio stream to modify a manner in which a user of the personal audio system hears the ambient audio stream, wherein the personal audio stream is a modified version of the ambient audio stream;
storing a most recent snippet of the ambient audio stream in a buffer memory;
detecting a trigger event from a set of trigger events, wherein at least one of the trigger events indicates or causes a change in the active processing parameter set; and
in response to detecting the trigger event, uploading from the buffer memory the most recent snippet of the ambient audio stream and associated metadata to a knowledgebase remote from the personal audio system, wherein the knowledgebase remote from the personal audio system analyzes the most recent snippet of the ambient audio stream, wherein the most recent snippet of the ambient audio stream comprises a duration of the ambient audio stream that occurs immediately preceding the trigger event;
receiving, from the knowledgebase, one or more processing parameter sets derived by the knowledgebase from snippets and associated metadata from a plurality of personal audio systems; and
storing the one or more processing parameter sets received from the knowledgebase in a parameter memory.

13. The method of claim 12, wherein
at least one of the trigger events is receiving, via a user interface, a command to modify the active processing parameter set, and
the metadata transmitted to the knowledgebase includes the active processing parameter set after modification.

14. The method of claim 12, further comprising:
storing one or more processing parameter sets in a parameter memory.

15. The method of claim 14, wherein
at least one of the trigger events is receiving, via a user interface, a command to store the active processing parameter set in the parameter memory, and
the metadata transmitted to the knowledgebase includes the active processing parameter set.

16. The method of claim 14, wherein
at least one of the trigger events is retrieving a selected one of the one or more processing parameter sets from the parameter memory for use as the active processing parameter set.

17. The method of claim 16, further comprising:
developing a profile of the ambient audio stream,
wherein the selected processing parameter set retrieved from the parameter memory is selected based on the profile of the ambient audio stream.

18. The method of claim 16, further comprising:
determining a geo-location of the personal audio system
wherein the processing parameters set retrieved from the parameter memory is selected based on the geo-location of the personal audio system.

19. The method of claim 12, wherein
the metadata transmitted to the knowledgebase includes a descriptor received from a issuer via a user interface.

20. The method of claim 12, further comprising:
determining a geo-location of the personal audio system, wherein
the metadata transmitted to the knowledgebase includes data indicating the geo-location of the personal audio system.

21. The method of claim 12, further comprising:
converting ambient sound into the ambient audio stream; and
converting the personal audio stream into personal output sound.

22. A system, comprising:
a knowledgebase; and
a plurality of personal audio systems in communications with the knowledgebase via a network, each personal audio system comprising:
- a processor to generate a personal audio stream by processing an ambient audio stream in accordance with an active processing parameter set, wherein the active processing parameter set indicates a type and degree of one or more processes to be performed on the ambient audio stream to modify a manner in which a user of the personal audio system hears the ambient audio stream, wherein the personal audio stream is a modified version of the ambient audio stream;
- a circular buffer memory to store a most recent snippet of the ambient audio stream;
- an event detector to detect a trigger event from a set of trigger events, wherein at least one of the trigger events indicates or causes a change in the active processing parameter set; and
- a controller configured to, in response to detection of the trigger event, upload from the circular buffer memory the most recent snippet of the ambient audio stream and associated metadata to the knowledgebase via the network,
wherein the knowledgebase is configured to analyze the most recent snippet of the ambient audio stream and create new and/or revised processing parameter sets based on snippets and metadata collectively received from the plurality of personal audio systems and to transmit the new and/or revised processing parameter sets to at least some of the plurality of personal audio systems, wherein the most recent snippet of the ambient audio stream comprises a duration of the ambient audio stream that occurs immediately preceding the trigger event.

23. The system of claim 22, wherein the knowledgebase is configured to push the new and/or revised processing parameter sets to the plurality of personal audio system on an as-available basis.

24. The system of claim 22, wherein the knowledgebase is configured to transmit the new and/or revised processing parameter sets to a particular personal audio system from the plurality of personal audio systems in response to a request from the particular personal audio system.

25. The system of claim 22, wherein the knowledgebase is configured to transmit the new and/or revised processing parameter sets to a particular personal audio system from the plurality of personal audio systems in response to a change in location of the particular personal audio system.

26. The system of claim 22, wherein the knowledgebase is configured to transmit the new and/or revised processing parameter sets to the at least some of the plurality of personal audio systems at predetermined periodic intervals.

* * * * *